(12) United States Patent
Forster et al.

(10) Patent No.: US 9,435,674 B2
(45) Date of Patent: Sep. 6, 2016

(54) FLOWMETER

(71) Applicant: Titan Enterprises Ltd., Sherborne, Dorset (GB)

(72) Inventors: Trevor Forster, Sherborne (GB); Michael Sanderson

(73) Assignee: Titan Enterprises Ltd., Sherborne, Dorset (GB)

( * ) Notice: Subject to any disclaimer, the term of this patent is extended or adjusted under 35 U.S.C. 154(b) by 0 days.

(21) Appl. No.: 14/416,899

(22) PCT Filed: Jul. 23, 2013

(86) PCT No.: PCT/EP2013/065548
§ 371 (c)(1),
(2) Date: Jan. 23, 2015

(87) PCT Pub. No.: WO2014/016311
PCT Pub. Date: Jan. 30, 2014

(65) Prior Publication Data
US 2015/0204705 A1 Jul. 23, 2015

(30) Foreign Application Priority Data

Jul. 24, 2012 (GB) .................................. 1213152.0

(51) Int. Cl.
*G01F 1/66* (2006.01)
(52) U.S. Cl.
CPC ............... *G01F 1/662* (2013.01); *G01F 1/667* (2013.01)
(58) Field of Classification Search
CPC ........................................................ G01F 1/66
USPC ................................................ 73/861.27–29
See application file for complete search history.

(56) References Cited

U.S. PATENT DOCUMENTS

| 4,365,518 | A | | 12/1982 | Zacharias, Jr. | |
|---|---|---|---|---|---|
| 4,523,478 | A | * | 6/1985 | Zacharias, Jr. | .......... G01F 1/662 73/861.28 |
| 5,383,369 | A | | 1/1995 | Khuri-Yakub et al. | |
| 5,652,396 | A | | 7/1997 | Gill | |
| 5,974,897 | A | * | 11/1999 | Koyano | .................. G01F 1/662 73/861.29 |
| 6,055,868 | A | * | 5/2000 | Koyano | .................. G01F 1/667 73/861.28 |
| 6,338,277 | B1 | | 1/2002 | Diston et al. | |
| 2005/0011280 | A1 | * | 1/2005 | Imai | ........................ G01F 1/667 73/861.27 |
| 2009/0151472 | A1 | | 6/2009 | Brown et al. | |
| 2012/0036942 | A1 | * | 2/2012 | Hasunuma | .............. G01F 1/662 73/861.28 |
| 2014/0190272 | A1 | * | 7/2014 | Laird | ..................... G01F 1/662 73/861.28 |

FOREIGN PATENT DOCUMENTS

| EP | 2351994 | 8/2011 |
|---|---|---|
| EP | 2366979 | 9/2011 |
| GB | 2146122 | 4/1985 |
| GB | 2400439 | 7/2006 |
| JP | 11325994 | 11/1999 |

OTHER PUBLICATIONS

Great Britain search report dated Nov. 23, 2012 of GB1213152.0 filed Nov. 21, 2012.
International search report dated Sep. 18, 2013 of PCT/EP2013/065548 filed Jul. 23, 2013.

* cited by examiner

*Primary Examiner* — Jewel V Thompson
(74) *Attorney, Agent, or Firm* — McDonnell Boehnen Hulbert & Berghoff LLP

(57) ABSTRACT

An acoustic flowmeter comprising a flow tube including an inner elongate member in the flow tube to define at least one flow passage for the flowmeter.

17 Claims, 5 Drawing Sheets

FLOWMETER

CROSS-REFERENCE TO RELATED APPLICATIONS

This application is a National Stage application of co-pending PCT application PCT/EP2013/065548 filed 23 Jul. 2013, which claims the benefit of GB application number 1213152.0 filed 24 Jul. 2012. These applications are incorporated herein by reference in their entireties.

FIELD OF THE INVENTION

The present invention relates to an acoustic flowmeter, and particularly to an ultrasonic flowmeter of the transit time differential type.

BACKGROUND

In the measurement of fluid flow using acoustic or ultrasonic transit time differential measurement techniques it is known that the ultrasonic waves must have a wave length which is greater than the diameter of the conduit in which the fluid flow is to be measured. Under certain flow and acoustic conditions the phase shift and hence the change of arrival time of an acoustic plane wave transmitted along a conduit is proportional only to the flow rate and independent of the velocity profile, that is whether the fluid is flowing with laminar or turbulent flow. A flowmeter having certain characteristics capable of developing a plane wave of axisymmetric form has previously been disclosed in Patent No. GB2400439. In this document a plane wave is generated by annular piezoelectric acoustic transducers located at either end of a flow tube. This construction, which has the advantage of being a clean bore meter, provides a transit time difference measurement the value of which is proportional to the flow rate of fluid in the flow tube. This means that the flowmeter provides a linear performance throughout the laminar and turbulent flow regimes. In other words it is independent of Reynolds number.

In order to generate a planar wavefront, however, the wave length of the ultrasound must be greater than the diameter of the conduit as mentioned above. Thus, for a given flow tube diameter this sets the maximum frequency of ultrasound which can be used in the flowmeter for given material. For example, if the flow meter is used to determine the flow rate of water (in which the speed of sound is approximately 1500 m/s) in a flow meter the flow tube of which has a diameter of 6 mm, then the frequency of the ultrasound needed to satisfy the plane wave requirement is approximately 250 kHz. In larger flow tube sizes which are required for higher flow rates, the wavelength must be even lower and therefore the maximum frequency which can be used in the flow meter is also lower. This has significant disadvantages in ultrasonic flowmeters for use in situations where the flow rate is not high since the time difference between ultrasonic waves propagated upstream and downstream may be as small as 10 nanoseconds. Measuring such small time differences becomes increasingly difficult as the frequency decreases with the increase in wavelength.

The present invention seeks to overcome the limitations of the prior art ultrasonic flowmeters using the plane wave approach to the measurement of the flow rate whilst, at the same time, retaining the linearity of the flow meter response over the whole range of potential flow rates, and regardless of whether the fluid under test is flowing with turbulent or laminar flow.

As used in this specification, the term "acoustic" will be understood to include "ultrasonic" as applied to flowmeters.

SUMMARY

According to one aspect of the present invention, there is provided an acoustic flowmeter comprising a flow tube including an inner elongate member in the flow tube to define at least one flow passage for the flowmeter. In an example, the inner elongate member can be an integral part of the flow tube such the tube and member are integrally formed thereby obviating the requirement for the member to be held in place as such. Alternatively, the member can be held in place using an adhesive material or similar for example.

The inner elongate member can be a flight within the flow tube or division of the flow tube. For example, a single division can be made down the length of the flow tube to define two flow passages through which a fluid can flow. The division can be tapered at either end thereof so as to minimise disruption of fluid flow, and the division can be an integral part of the flow tube or connected thereto such as by gluing, welding or some other suitable form of connection. Such a division can be termed a flight.

The inner elongate member can comprise multiple flights extending the length of the flow tube to form multiple flow passages defined by a wall of the flow tube and the multiple flights. For example, two or more flights, particularly three or more flights, can be provided. The flights are arranged to define multiple flow passages for fluid. As such, the flights are mounted in or otherwise held in position in the flow tube such that the outer body of the flow tube and the flights define the multiple flow passages for the flowmeter.

The provision of a division or flights within the flow tube enables the formation of multiple, such as two or more, flow passages through which fluid can pass. Forming flow passages in this way means that there are no dimensions of the flow tube through which fluid flows at the point of measurement that are such that they exceed the wavelength of the speed of sound in the fluid concerned. Thus, a planar wavefront can be used to measure the flow rate of the fluid without suffering from the disadvantages mentioned above.

According to an example, multiple flow passages can be defined by holes bored or otherwise provided in a flow tube. For example, a solid flow tube can be provided with multiple holes therethrough that extend down the length of the tube and which define the multiple flow passages. Such holes can be circular, square or any other shape.

According to one aspect of the present invention, there is provided an acoustic flowmeter comprising a flow tube with an annular flow passage within which, in use of the flowmeter, fluid the flow rate of which is to be determined is caused to flow.

In a preferred embodiment of the invention the annular passage is defined by a generally cylindrical wall of an outer body and an inner elongate core body held in position within the said flow passage by one or more generally radially extending support arms projecting inwardly from the said outer body.

In order to operate in the transit time differential mode there are provided two acoustic transducers located axially spaced along the said annular flow passage. It is, of course, possible to operate the flowmeter of the present invention using the Doppler technique (for suitable fluids) in which case only a single acoustic transducer may be needed.

The or each acoustic transducer may be mounted on the outer body, on the inner elongate core body, or on the radial support arms connecting the inner core to the outer body. The electrical supply to the or each transducer may be directed through the radial support arms which interconnect the outer cylindrical body and the inner elongate core body.

With two transducers it is thus possible for the flowmeter control circuitry to effect a transit time differential determination of the flow rate of the fluid.

The acoustic transducers may be excited simultaneously and continuously (in use). Alternatively, the said control circuitry can excite the said acoustic transducers in sequence whereby to transmit and receive acoustic signals alternately; in such an arrangement each transducer is connected to receive acoustic signals when the other transducer is being excited to transmit them.

In one practical construction, the acoustic transducers extend at least part-way around the circumference of the inner or outer body defining the said annular flow passage and the control circuitry is operable to excite the transducers at a frequency such as to generate a substantially planar wave front travelling axially along the said flow passage. Alternatively, the acoustic transducers may extend substantially entirely around the circumference of the said outer or inner body defining the said annular flow passage, and act when energised to transmit a substantially axisymmetrical acoustic wave front along the said flow passage.

In an example the said generally radially extending support arms have feathered leading and trailing edges whereby to provide minimal disruption to the streamline flow of fluid in the said annular passage.

The annular passage may have a generally circular cross-section although, more generally, the annular passage may have a generally polygonal cross-section. In such case the acoustic transducers may have flat faces in contact with one of the sides of the polygon. For connection with the flow meter into an external circuit the flow tube may be provided with connector means at each end of the said annular flow passage whereby to couple the flow passage to conduits of an external flow circuit. Such connector means preferably taper from one end to the other whereby smoothly to vary the flow cross-section of the fluid path entering and leaving said annular flow passage.

Likewise, the said central core body can include a tapered portion at each end thereof. These tapered portions at each end of the said central core body may extend into the said tapered connector means.

BRIEF DESCRIPTION OF THE DRAWINGS

Embodiments of the present invention will now be more particularly described, by way of example only, with reference to the accompanying drawings, in which.

DETAILED DESCRIPTION

Figure 1:
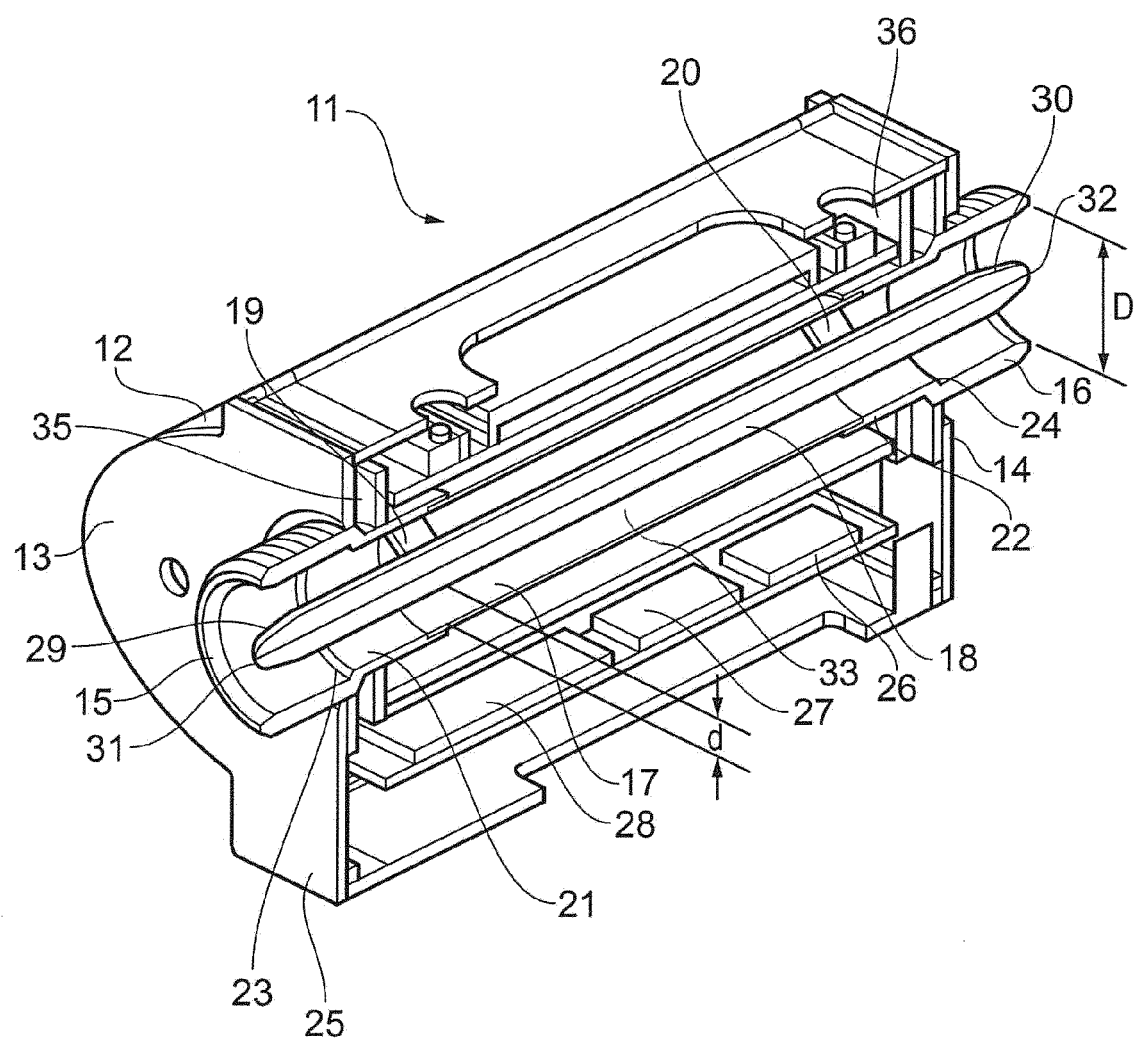
FIG. 1 is an axial sectional view through a part of a flowmeter having an annular passage.

Example embodiments are described below in sufficient detail to enable those of ordinary skill in the art to embody and implement the systems and processes herein described.

It is important to understand that embodiments can be provided in many alternate forms and should not be construed as limited to the examples set forth herein.

Accordingly, while embodiments can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

The terminology used herein to describe embodiments is not intended to limit the scope. The articles "a," "an," and "the" are singular in that they have a single referent, however the use of the singular form in the present document should not preclude the presence of more than one referent. In other words, elements referred to in the singular can number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

Referring now to FIG. 1, it is to be understood that this is a schematic representation of the main components of a flowmeter suitable for connection into an external circuit to determine the flow rate of the fluid in the circuit. Parts and components of the flowmeter not necessary for a comprehension of the invention as such have been omitted for clarity.

In FIG. 1, an acoustic flowmeter generally indicated 11 comprises an outer casing 12 of generally cylindrical form, having two opposite flat end walls 13, 14 through which pass respective generally cylindrical connector members 15, 16 for connecting the flowmeter 11 to an external fluid circuit within which flows a fluid the flow rate of which is to be investigated.

At the heart of the flowmeter 11 is a cylindrical flow tube 17 made from an ultrasonically reflective material such as stainless steel. The precise choice of material is determined by the operating fluid within the flowmeter, together with any regulations or user requirements for a particular application. Stainless steel is a useful material but may not be the only suitable material for the flow tube. Other suitable materials include polycarbonate, polyphenol sulfone, epoxy resins, polyester and polytetrafluoroethylene (PTFE), but this list is not exhaustive.

Within the flow tube is located a central elongate core body 18 held in a position co-axial with the flow tube 17 by two generally radially extending inwardly projecting support arms 19, 20 having feathered leading and trailing edges (not illustrated) to provide a minimum disruption to the flow of fluid through the flow tube 17. The central core body 18 is significantly longer than the flow tube 17 for reasons which will be explained in more detail below, and may be made of a composite material.

Surrounding the ends of the flow tube 17 are two cylindrical acoustic couplers 21, 22 which are shaped such that the internal bore of the acoustic coupler is flush with the internal surface of the flow tube 17.

The acoustic coupler 21 is sealingly connected to the connector 15 which, as can be seen in FIG. 1, has a shoulder or taper section 23 mid-way along its length. The diameter change from the outermost part of the connector 15 to the inner part which is united with acoustic coupler 20 being inclined such as to achieve a reduction in the flow cross-section within the connector with a minimum disturbance to the streamline flow of fluid passing through it. At the other end of the flowmeter there is a similar configuration of the acoustic coupler 22 connected to the connector 16 which in turn has a tapered shoulder 24 mid-way along its length for the same purpose as described above.

The generally cylindrical body of the casing 12 has a longitudinally extending foot 25 within which are housed the printed circuit boards 26, 27, 28 which constitute the electronic control circuitry for the flowmeter.

The ends of the central core body 18 have tapered sections 29, 30 each with a rounded end 31, 32 and this tapered section at each end extends into the interior of the associated connector 15, 16 so that the flow cross-section of the annular passage 33 defined between the cylindrical outer flow tube body 17 and the inner central core body 18 reduces progressively from the ends of the connector, corresponding to the end close to the rounded nose end 31, 32 of the tapered sections of the central core body 18, down to the constant dimension along the length of the outer cylindrical body 17 of the flow tube.

Surrounding the acoustic couplers 21, 22 are respective annular acoustic transducers 35, 36 in the form of piezoelectric crystals which are chosen to have radially inner and outer diameters appropriate to the frequency to the ultrasound which is being employed in the particular application. The calculation of the appropriate frequency depends on the nature of the fluid flowing through the instrument, the range of flow rates which are to be determined, the temperature and pressure of the fluid, the nature of the material of the flow tube 17, and the length of the flow tube 17 which determines the spacing between the two acoustic transducers 35, 36.

The piezoelectric annular transducer elements 35, 36 are excited across their thickness at a frequency which corresponds to a resonance in a radial direction in order to achieve the appropriate energisation frequency of the acoustic signal. Mode conversion occurs on transmission between the excitation across the thickness of the transducer and the radial mode of response when transmitting, and in reverse between the radial disturbance upon receiving and the excitation in the thickness mode.

The radially inner surfaces of the piezoelectric transducers are attached, for example by suitable acoustic adhesive or simply in contact via a suitable mastic in order to exclude the possibility of any air gaps, to the polymeric annular acoustic couplers 21, 22 which act as matching layers between the piezoelectric material and the fluid flowing in the flow tube. The choice of polymer materials is constrained by the operating fluid within the flowmeter and the regulations for user requirements for the particular application. Typically this may be a suitable grade of PEEK.

The flow tube 17 and the inner core body 18 have constant transverse dimensions so that the annular passage 33 within which the fluid flows in use of the flowmeter has a constant transverse dimension which in view of the presence of the central core body 18 has an effective transverse dimension d which is less than the diameter of the connect thereby allowing higher frequencies of acoustic signal to be utilised for a given set of fluid type and flow rate conditions.

As mentioned above, the dimensions of the elements of the flowmeter 11 are chosen with respect to the diameter of the surrounding conduits of the external circuit, the maximum flow rate which is required to be measured and the allowable pressure drop across the flowmeter.

Techniques for the excitation of the piezoelectric crystal material to ensure good zero stability using a reciprocal drive action are known to those skilled in this art. A control scheme identified by Sanderson in UK Patent 2400439 is suitable for this purpose. Time and amplitude difference methods are suitable for this purpose.

Figure 2:
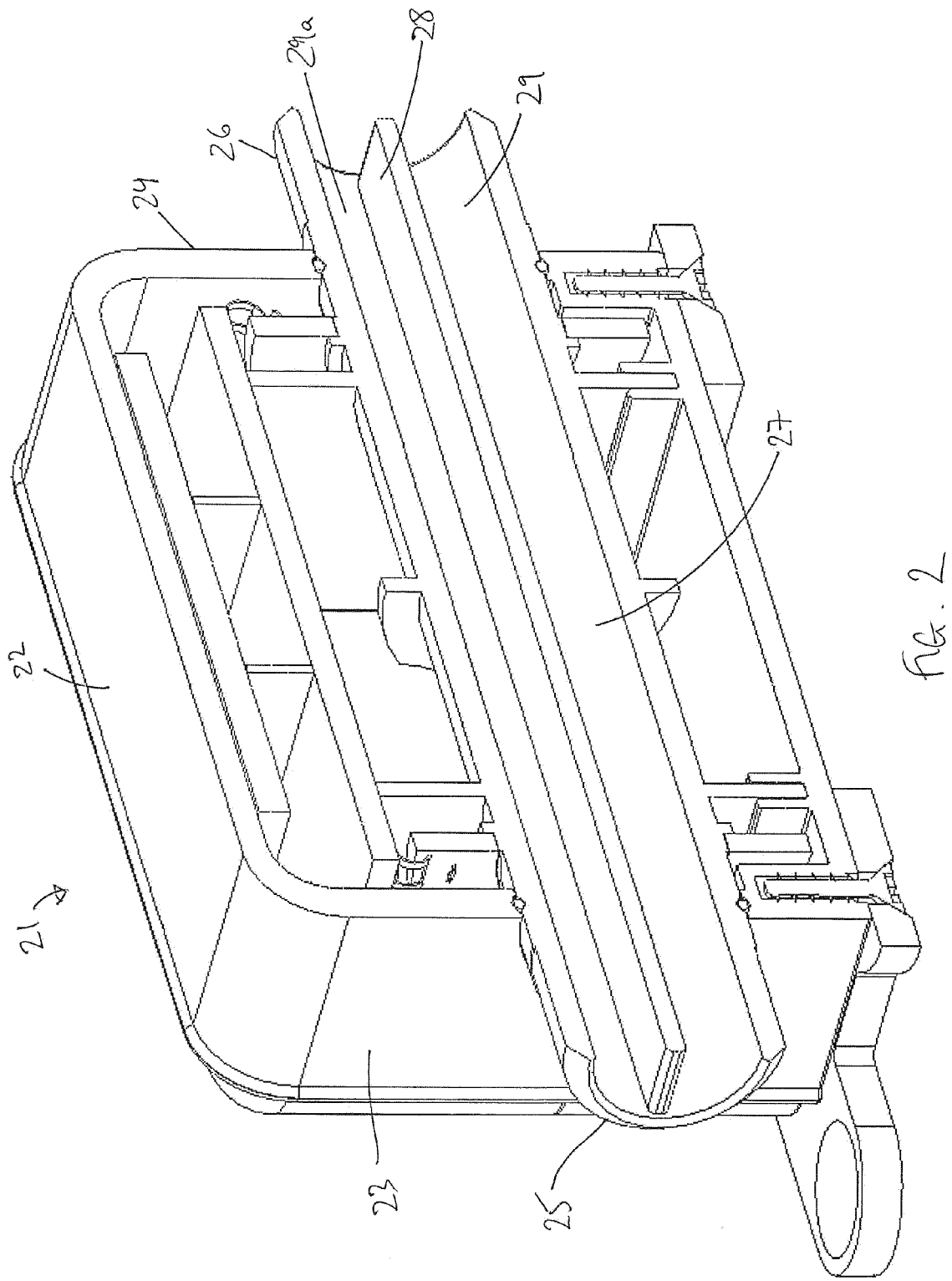
FIG. 2 is an axial sectional view through a part of a flowmeter having multiple passages.

In an alternative example, as depicted in FIG. 2, an acoustic flowmeter generally indicated 21 comprises an outer casing 22 of generally cylindrical form, having two opposite end walls 23, 24 through which pass respective generally cylindrical connector members 25, 26 for connecting the flowmeter 21 to an external fluid circuit within which flows a fluid the flow rate of which is to be investigated.

At the heart of the flowmeter 21 is a cylindrical flow tube 27 made from an ultrasonically reflective material such as stainless steel. The precise choice of material is determined by the operating fluid within the flowmeter, together with any regulations or user requirements for a particular application. Stainless steel is a useful material but may not be the only suitable material for the flow tube. Other suitable materials include polycarbonate, polyphenol sulfone, epoxy resins, polyester and polytetrafluoroethylene (PTFE), but this list is not exhaustive.

Within the flow tube is located an inner elongate body 28 in the form of a division that extends axially down the length of the flow tube 27. The body 28 may be longer than the flow tube 27, and may be made of a composite material. The central elongate body 28 can have feathered leading and trailing edges (not illustrated) to provide a minimum disruption to the flow of fluid through the flow tube 27.

The body 28 effectively separates the flow tube 27 into two regions 29, 29a to form multiple flow passages for fluid, thereby ensuring that the dimensions of the flow tube 27 in the region in which fluid flow rate is to be measured are such that there is no dimension that is greater than the wavelength of the speed of sound in the fluid under investigation. Although depicted in a broadly horizontal orientation with respect to the flow meter 21, the elongate body 28 can be arranged in any orientation.

Figure 3:
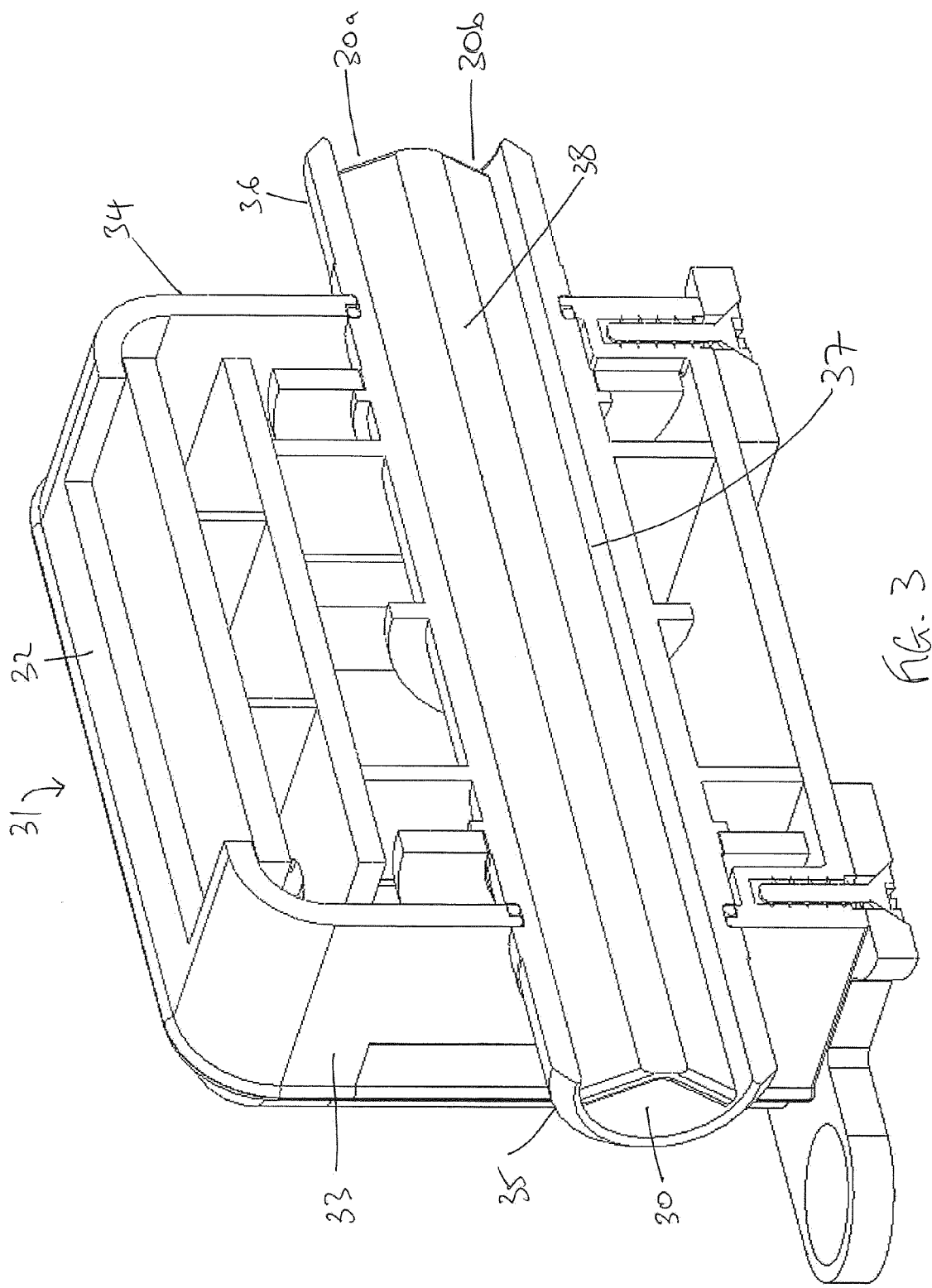
FIG. 3 is an axial sectional view through a part of a flowmeter having multiple passages.

FIG. 3 is a further alternative embodiment, which, similarly to FIG. 2 depicts an acoustic flowmeter generally indicated 31 which comprises an outer casing 32 of generally cylindrical form, having two opposite end walls 33, 34 through which pass respective generally cylindrical connector members 35, 36 for connecting the flowmeter 31 to an external fluid circuit within which flows a fluid the flow rate of which is to be investigated.

At the heart of the flowmeter 31 is a cylindrical flow tube 37 made from an ultrasonically reflective material such as stainless steel. The precise choice of material is determined by the operating fluid within the flowmeter, together with any regulations or user requirements for a particular application. Stainless steel is a useful material but may not be the only suitable material for the flow tube. Other suitable materials include polycarbonate, polyphenol sulfone, epoxy resins, polyester and polytetrafluoroethylene (PTFE), but this list is not exhaustive.

Within the flow tube is located an inner elongate body 38 in the form of a set of flights or divisions that extend axially down the length of the flow tube 37. In the example of FIG. 3, three flights/divisions are present, although only two are shown due to the cut-away nature of the diagram. It will be appreciated that a third flight is present but not shown. The central body 38 may be longer than the flow tube 37, and may be made of a composite material. The central elongate body 38 can have feathered leading and trailing edges (not illustrated) to provide a minimum disruption to the flow of fluid through the flow tube 37.

The multiple flights of the body 38 effectively separate the flow tube 37 into multiple regions 30, 30a, 30b defined by the walls of the flights and the flow tube 37, thereby ensuring that the dimensions of the flow tube 37 in these regions in which fluid flow rate is to be measured are such that there is no dimension that is greater than the wavelength of the speed of sound in the fluid under investigation. That is, multiple flow passages are created by the flights and the flow tube. The flights can be arranged in any orientation, and although they are shown as being equally spaced, flights can be arranged so that they subtend different angles to one another for example.

Figure 4:
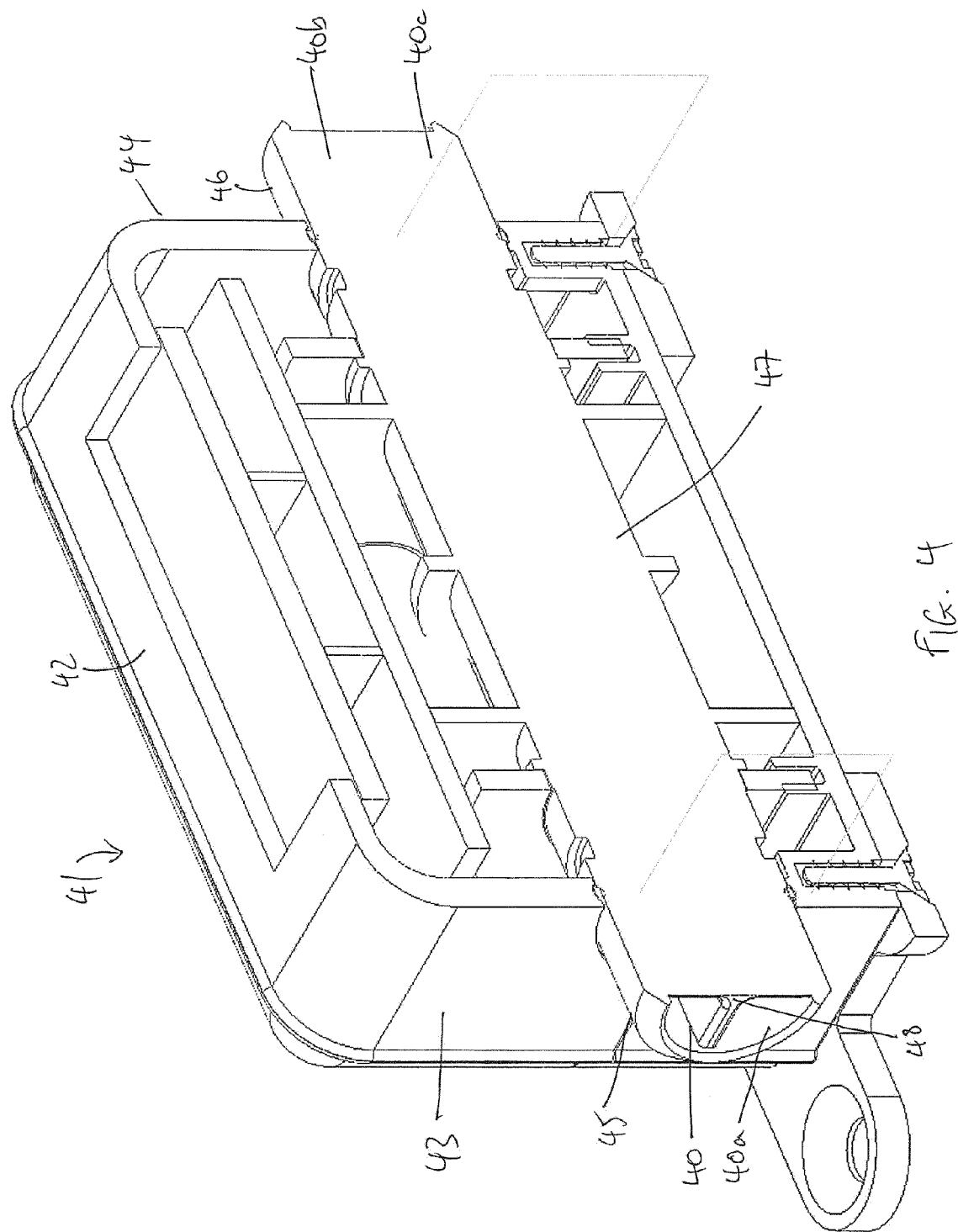
FIG. 4 is an axial sectional view through a part of a flowmeter having multiple passages.

FIG. 4 is yet a further alternative embodiment which, similarly to FIGS. 2 and 3 depicts an acoustic flowmeter generally indicated 41 which comprises an outer casing 42 of generally cylindrical form, having two opposite end walls 43, 44 through which pass respective generally cylindrical connector members 45, 46 for connecting the flowmeter 41 to an external fluid circuit within which flows a fluid the flow rate of which is to be investigated.

At the heart of the flowmeter 41 is a cylindrical flow tube 47 made from an ultrasonically reflective material such as stainless steel. The precise choice of material is determined by the operating fluid within the flowmeter, together with any regulations or user requirements for a particular application. Stainless steel is a useful material but may not be the only suitable material for the flow tube. Other suitable materials include polycarbonate, polyphenol sulfone, epoxy resins, polyester and polytetrafluoroethylene (PTFE), but this list is not exhaustive.

Within the flow tube is located an inner elongate body 48 in the form of a set of flights or divisions that extend axially down the length of the flow tube 47. In the example of FIG. 4, four flights are present, although only one is shown in its entirety due to the cut-away nature of the diagram. It will be appreciated that other flights are present but not shown, either at all in the case of the fourth flight, or in their complete state as in the case of two of the flights as will be apparent from the figure. The central body 48 may be longer than the flow tube 47, and may be made of a composite material. The central elongate body 48 can have feathered leading and trailing edges (not illustrated) to provide a minimum disruption to the flow of fluid through the flow tube 47.

The body 48 effectively separates the flow tube 47 into multiple regions 40, 40a, 40b and 40c (40b and 40b are noted in the figure but not strictly shown due to the cut-away nature of the figure) defined by the walls of the flights and the flow tube 47, thereby ensuring that the dimensions of the flow tube 47 in these regions in which fluid flow rate is to be measured are such that there is no dimension that is greater than the wavelength of the speed of sound in the fluid under investigation. That is, multiple flow passages are created by the flights and the flow tube. The flights can be arranged in any orientation, and although they are shown as being equally spaced, flights can be arranged so that they subtend different angles to one another for example. In an example, more than four flights can be provided.

Figure 5:
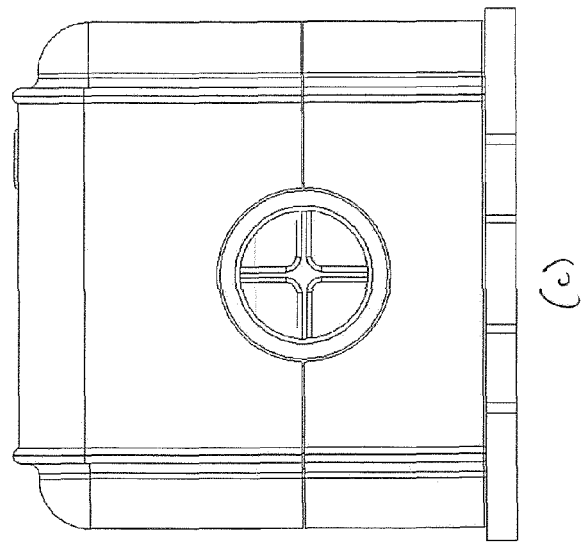
FIGS. 5*a-c* are side on views of flowmeters as shown in FIGS. 2 to 4 having multiple passages.
Figure 5:
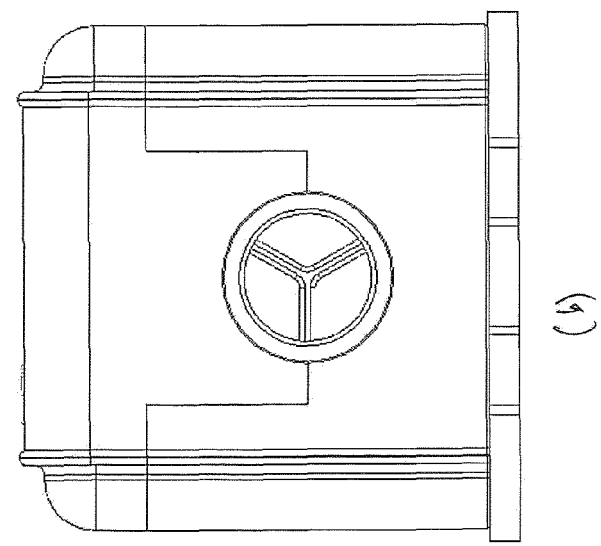
Figure 5:
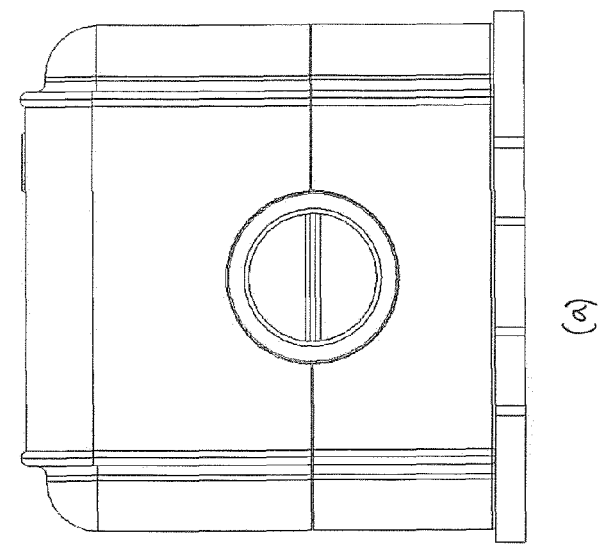

FIGS. 5a-c are schematic representations showing end on views of the flowmeters of FIGS. 2, 3 and 4 respectively. As can be seen, the flights of the embodiments described with reference to FIGS. 3 and 4 are equally spaced around the circumference of the flow tube. It will be appreciated that alternative embodiments are possible in which the spacing of lights is not equal. Also, it will be apparent that the flights need not be arranged exactly as depicted, and may be rotated—for example, the flights of FIG. 4/5c may be arranged in an 'X' formation and so on.

The invention claimed is:

1. An acoustic flowmeter comprising a flow tube including an inner elongate member in the flow tube to define at least one flow passage for the flowmeter, in which the inner elongate member comprises multiple flights or divisions extending the length of the flow tube to form multiple flow passages defined by a wall of the flow tube and the multiple flights or divisions.

2. An acoustic flowmeter comprising a flow tube with an annular flow passage, in which the annular flow passage is defined by generally cylindrical wall of an outer body and an inner elongate core body held in position within the said flow passage by one or more generally radially extending support arms projecting inwardly from the said outer body.

3. An acoustic flowmeter as claimed in claim 2, in which two acoustic transducers are located axially spaced along the said annular flow passage.

4. An acoustic flowmeter as claimed in claim 3, in which the said acoustic transducers are mounted on the said outer body.

5. An acoustic flowmeter as claimed in claim 3, in which the said acoustic transducers are mounted on the said inner elongate core body.

6. An acoustic flowmeter as claimed in claim 2, in which the acoustic transducers are connected to control means operable to effect a transit time differential determination of the flow rate of the fluid.

7. An acoustic flowmeter as claimed in claim 6, in which the said control means are operable to excite the said acoustic transducers in a continuous, simultaneous manner or in sequence whereby to transmit and receive acoustic signals alternately, each transducer being connected to receive acoustic signals when the other transducer is being excited to transmit them.

8. An acoustic flowmeter as claimed in claim 2, in which the said generally radially extending support arms have feathered leading and trailing edges whereby to provide minimal disruption to the streamline flow of fluid in the said annular passage.

9. An acoustic flowmeter as claimed in claim 2, in which there are provided connector means at each end of the said annular flow passage whereby to connect the flow passage to conduits of an external fluid circuit.

10. An acoustic flowmeter as claimed in claim 6, in which the said connector means taper from one end to the other whereby smoothly to vary the flow cross section of the fluid path entering and leaving the said annular flow passage.

11. An acoustic transducer as claimed in claim 2, in which the said central core body has a tapered portion at each end thereof.

12. An acoustic transducer as claimed in claim 8, in which the said tapered portions at each end of the said central core body extend into connector means at each end of the said annular flow passage whereby to connect the flow passage to conduits of an external fluid circuit.

13. An acoustic flowmeter as claimed in claim 2, in which two acoustic transducers are located axially spaced along the or each flow passage.

14. An acoustic flowmeter as claimed in claim 10, in which the said acoustic transducers are mounted on an outer body of the flow tube.

15. An acoustic flowmeter as claimed in claim 10, in which the said acoustic transducers are mounted on the said inner elongate member.

16. An acoustic flowmeter as claimed in claim 13, in which the said control means are operable to excite the said acoustic transducers in a continuous, simultaneous manner or in sequence whereby to transmit and receive acoustic signals alternately, each transducer being connected to receive acoustic signals when the other transducer is being excited to transmit them.

17. An acoustic flowmeter as claimed in claim 3, in which the said acoustic transducers are mounted on the radially extending support arms.

\* \* \* \* \*